United States Patent
Nagatomi (10) Patent No.: US 8,102,748 B2
(45) Date of Patent: Jan. 24, 2012

(54) OPTICAL PICKUP DEVICE

(75) Inventor: Kenji Nagatomi, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/715,903

(22) Filed: Mar. 2, 2010

(65) Prior Publication Data

US 2010/0226235 A1    Sep. 9, 2010

(30) Foreign Application Priority Data

Mar. 3, 2009  (JP) .................................. 2009-049658

(51) Int. Cl.
G11B 7/00 (2006.01)

(52) U.S. Cl. .............. 369/112.23; 369/44.23; 369/44.32

(58) Field of Classification Search ............. 369/112.23, 369/44.23, 44.32
See application file for complete search history.

(56) References Cited

U.S. PATENT DOCUMENTS

| | | | |
|---|---|---|---|
| 7,664,004 B2 * | 2/2010 | Shindo | 369/112.23 |
| 2007/0133372 A1 * | 6/2007 | Hirai | 369/112.01 |
| 2008/0049585 A1 | 2/2008 | Shindo | |

FOREIGN PATENT DOCUMENTS

JP    2008-52778 A    3/2008

OTHER PUBLICATIONS

Chinese Office Action for corresponding CN Application No. 201010129522.3, Jun. 9, 2011, pp. 1-9.

* cited by examiner

*Primary Examiner* — Latanya Bibbins
(74) *Attorney, Agent, or Firm* — Ditthavong Mori & Steiner, P.C.

(57) ABSTRACT

An optical pickup device radiates laser light to a disc having a plurality of recording layers in a direction of lamination. The optical pickup device includes a laser light source, a collimator lens, and an objective lens. The collimator lens changes a spread angle of the laser light emitted from the laser light source. The objective lens converges the laser light having passed through the collimator lens onto the disc. With the laser light in a parallel state having passed through the collimator lens, if a distance f between the laser light source and the collimator lens and a distance L between the collimator lens and the objective lens are in a relation of f<L, the objective lens brings the laser light into focus with minimum spherical aberration at a designed focal position on an inner side of an intermediate position between the foremost and innermost recording layers.

3 Claims, 11 Drawing Sheets

OPTICAL PICKUP DEVICE

This application claims priority under 35 U.S.C. Section 119 of Japanese Patent Application No. 2009-049658 filed Mar. 3, 2009, entitled "OPTICAL PICKUP DEVICE". The discloser of the above application is incorporated herein by reference.

BACKGROUND OF THE INVENTION

1. Field of the Invention

The present invention relates to an optical pickup device, and more specifically, is suitable for use in an optical pickup device that records/reproduces information on/from a recording medium in which a plurality of recording layers is laminated.

2. Disclosure of Related Art

In recent years, optical discs have been increasing in capacity. High-capacity optical discs can be realized by arranging a plurality of recording layers in one disc. For example, there are commercialized multilayer-type discs such as digital versatile discs (DVDs) and Blu-ray discs with two recording layers on one side. Providing three or more recording layers would further increase capacity of optical discs.

For the use of a disc with a plurality of recording layers, an objective lens is generally designed to focus on an intermediate position between the foremost and innermost recording layers. When laser light is converged on each of the recording layers, a spread angle of the laser light with respect to the objective lens is adjusted to be suitable for the recording layer. This reduces laser light aberration at the convergence on each of the recording layers.

However, when the spread angle of laser light is modified as stated above, a rim intensity of the laser light entered into the objective lens changes accordingly. With such a change in the rim intensity, the laser light varies in spot diameter and optical intensity among the recording layers, which may interfere with stable recording performance. This problem becomes more pronounced with a larger number of laminated recording layers and an increasing distance between the foremost and innermost recording layers.

The foregoing problem associated with the rim intensity can be suppressed by reducing rim intensity differences due to shift of a laser light focal position within the range of the foremost to innermost recording layers.

SUMMARY OF THE INVENTION

One aspect of the present invention relates to an optical pickup device that records and/or reproduces information onto and/or from a disc having a plurality of recording layers in a direction of lamination. The optical pickup device in this aspect includes a laser light source; an angle adjustment element that moves in a direction of an optical axis to change a spread angle of laser light emitted from the laser light source; and a converging lens part that converges the laser light having passed through the angle adjustment element onto the disc. In this arrangement, with the laser light in a parallel state having passed through the angle adjustment element, if a distance $L1$ between the laser light source and the angle adjustment element and a distance $L2$ between the angle adjustment element and the converging lens are in a relation of $L1<L2$, the converging lens part is configured to bring the incident parallel laser light into focus with minimum spherical aberration at a designed focal position on the inner side of an intermediate position between the foremost and innermost recording layers. In addition, if the distances $L1$ and $L2$ are in a relation of $L1>L2$, the converging lens is configured to bring the incident parallel laser light into focus with minimum spherical aberration at a designed focal position on the front side of the intermediate position.

BRIEF DESCRIPTION OF THE DRAWINGS

The foregoing and other objectives and novel features of the present invention will be more fully understood from the following description of preferred embodiments when reference is made to the accompanying drawings.

However, the drawings are only for illustration and are not intended to limit the scope of the present invention.

DESCRIPTION OF PREFERRED EMBODIMENTS

A preferred embodiment of the present invention will be described below with reference to the drawings. This embodiment is arranged in such a manner that the present invention is applied to an optical pickup device that supports an optical disc with a plurality of recording layers laminated in a direction of thickness.

Embodiment

Figure 1:
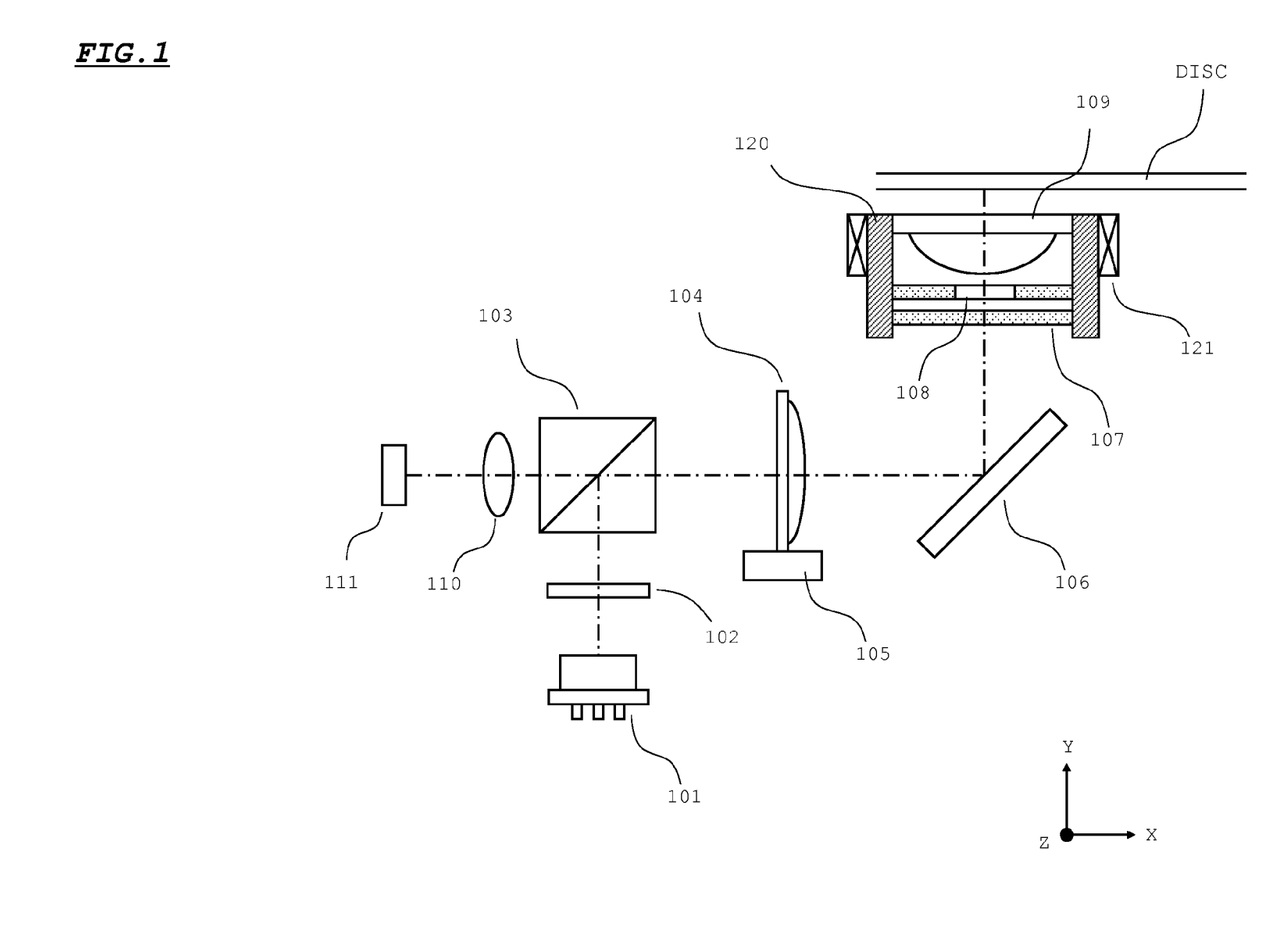
FIG. 1 is a diagram for showing an arrangement of an optical pickup device in an embodiment of the present invention.

FIG. 1 shows an optical system in the optical pickup device in this embodiment.

A semiconductor laser 101 emits laser light with a predetermined wavelength. A half wavelength plate 102 adjusts the laser light emitted from the semiconductor laser 101 into s-polarized light with respect to a polarized beam splitter (PBS) 103. The PBS 103 reflects almost totally the laser light (s-polarized light) entered from the half wavelength plate 102 and then transmits almost totally the laser light (p-polarized light) entered from a collimator lens 104.

The collimator lens 104 converts the laser light entered from the PBS 103 into parallel light. A lens actuator 105 displaces the collimator lens 104 in a direction of an optical axis so that any spherical aberration on the laser light can be corrected. A standing mirror 106 reflects the laser light entered from the collimator lens 104 in a direction toward an objective lens 109.

A quarter wavelength plate 107 converts the laser light traveling toward a disc into circularly polarized light, and changes a polarization direction of the light reflected from the disc to a vertical direction with respect to a polarization direction of the laser light toward the disc. Accordingly, the laser light reflected from the disc almost totally passes through the PBS 103, and then is guided to an anamorphic lens 110.

An aperture 108 adjusts a beam shape of the laser light to a circle so that an effective diameter of the laser light becomes appropriate to the objective lens 109. The objective lens 109 is designed to appropriately converge the laser light onto a target recording layer in the disc. A detailed structure of the objective lens 109 will be described later.

A holder 120 holds the quarter wavelength plate 107, the aperture 108, and the objective lens 109 in an integrated fashion. An objective lens actuator 121 is formed by a conventionally well-known, electromagnetically-driven circuit to drive the holder 120 in directions of focusing and tracking.

The laser light applied to the disc is reflected by a recording layer arranged in the disc. The reflected laser light travels backward on the foregoing light path, passes through the PBS 103, and then enters into the anamorphic lens 110. The anamorphic lens 110 introduces astigmatism to the light reflected from the disc.

A photodetector 111 receives the laser light with the astigmatism and outputs a detection signal. The photodetector 111 has a quadrant sensor for receiving the laser light. The signal output from the quadrant sensor is used to generate a focus error signal by the astigmatic method, a tracking error signal by the 1-beam push-pull method, and a reproduction RF signal.

Figure 2A:
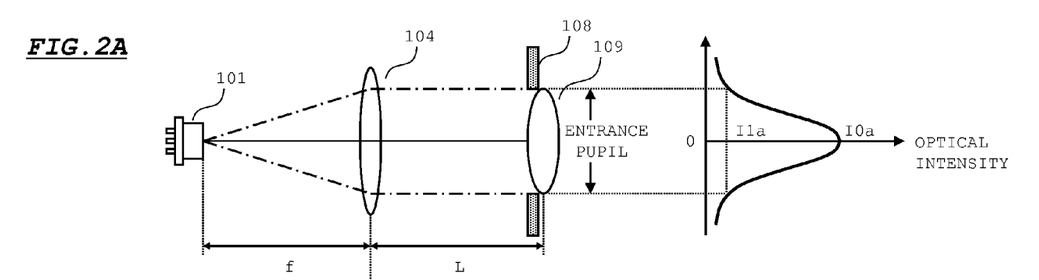
FIGS. 2A to 2C are diagrams for describing the embodiment, and show schematically that optical intensity of laser light entered into an objective lens varies depending on a position of a collimator lens.
Figure 2B:
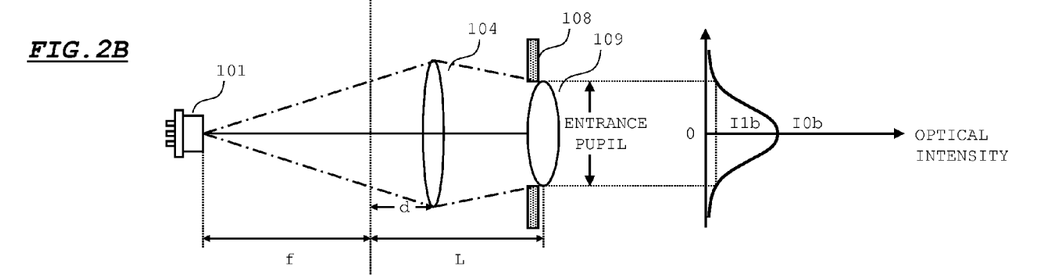
Figure 2C:
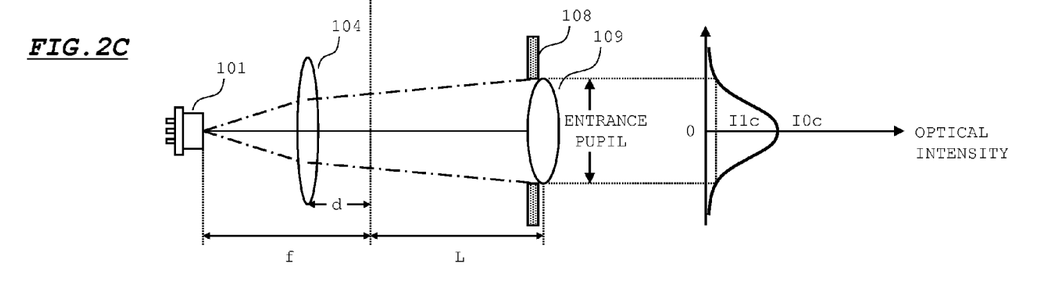

FIGS. 2A to 2C schematically show that the laser light entered into the objective lens 109 varies in optical intensity depending on a position of the collimator lens 104. FIG. 2A indicates that a distance between the semiconductor lens 101 and the collimator lens 104 and a distance L between the collimator lens 101 and the objective lens 109, are both equal to a focal length f of the collimator lens 104. FIGS. 2B and 2C show that the collimator lens 104 is shifted along the optical axis by d from the state shown in FIG. 2A toward the objective lens 109 (right side), and toward the semiconductor laser 101 (left side), respectively.

In each of the graphs of optical intensity, an axis of ordinate indicates a position of the objective lens in an entrance pupil, and an axis of abscissas indicates optical intensity. In FIGS. 2A to 2C, the optical components identical to those shown in FIG. 1 are given the same reference numerals as those in FIG. 1.

In the state of FIG. 2A, the distance between the semiconductor laser 101 and the collimator lens 104 is equal to the focal length f of the collimator lens 104, and therefore the laser light emitted from the collimator lens 104 toward the objective lens 109 becomes parallel. Further, in each of the graphs of optical intensity, the optical intensity becomes larger at an optical axis position (0 on the ordinate) as compared with the cases where the collimator lens 104 is located at any other positions as shown in FIGS. 2B and 2C.

In the states of FIGS. 2B and 2C, the collimator lens 104 is shifted by d along the optical axis from the state shown in FIG. 2A to the left and right, respectively, and therefore the laser light emitted from the collimator lens 104 toward the objective lens is not parallel. In addition, in the graphs of optical intensity, the optical intensity becomes smaller at the optical axis position (0 on the axis of ordinate) as compared with the state of FIG. 2A.

Here, assuming that the intensity of light entered into a center of the objective lens and the intensity of light entered into an outer edge of the objective lens are designated as I0 and I1, respectively, the rim intensity of the laser light entered into the objective lens 109 (a ratio of the intensity of light entered into the objective lens center to the intensity of light entered into the objective lens outer edge) can be expressed as I1/I0. Specifically, the rim intensity can be expressed as I1$a$/I0$a$ in FIG. 2A, and the rim intensity can be expressed as I1$b$/I0$b$ and I1$c$/I0$c$ in FIGS. 2B and 2C, respectively. In addition, among FIGS. 2A to 2C, the rim intensity is smallest in FIG. 2A.

Figure 3A:
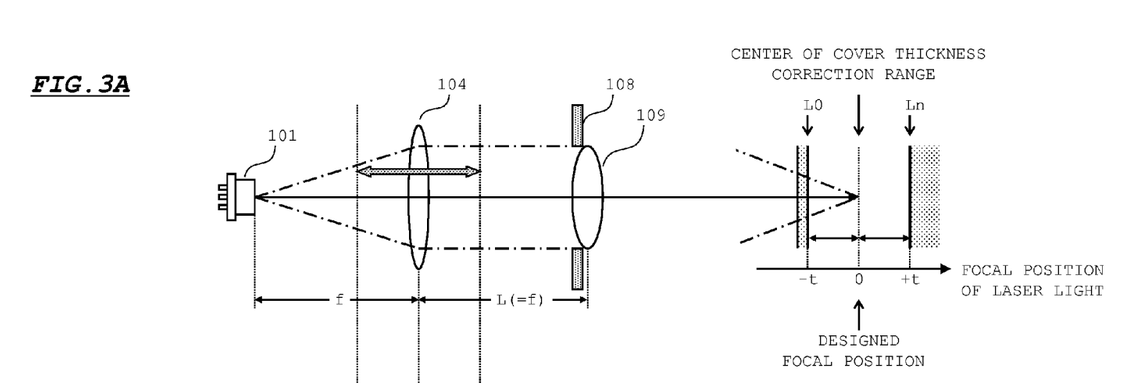
FIGS. 3A and 3B are diagrams for describing the embodiment, and show that a rim intensity varies depending on a position of the collimator lens.
Figure 3B:
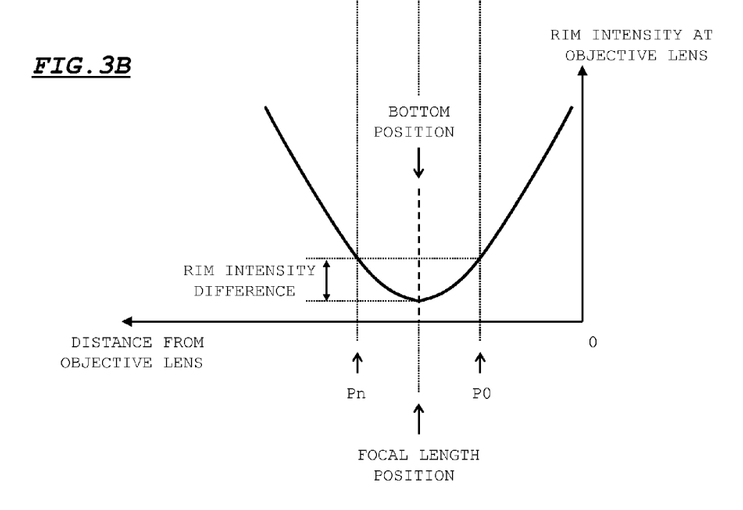

FIGS. 3A and 3B show that the rim intensity varies depending on the position of the collimator lens 104. In FIG. 3A, the optical components identical to those shown in FIG. 1 are given the same reference numerals as those in FIG. 1.

FIG. 3A shows the state of the laser light converged on the disc, which is converted from the graph of optical intensity in FIG. 2A. The disc has n recording layers, and a recording layer L0 is located at a foremost position and a recording layer Ln at an innermost position. In addition, the focal position of the laser light determined by the objective lens 109 is shown in a positive direction along the optical axis toward the inner side of the disc.

FIG. 3B is a graph of the rim intensity described above with reference to FIGS. 2A to 2C in correspondence with the position of the collimator lens 104. The axis of ordinate indicates the rim intensity, and the axis of abscissas indicates the position of the collimator lens 104 shifting to the left along the optical axis with respect to the objective lens 109 positioned at 0.

Referring to FIG. 3A, the objective lens 109 is designed in such a manner that, when the semiconductor laser 101, the collimator lens 104, and the objective lens 109 are in a positional relation of FIG. 3A, the laser light is focused with minimum spherical aberration to a center of a cover thickness correction range (from the recording layers L0 to Ln, which is also applied hereinafter). Assuming that the focal position is zero at that time, the focal position of the laser light determined by the objective lens 109 is shifted between −t and +t in accordance with the number of the recording layers in the disc.

In FIG. 3A, since the collimator lens 104 is located at a position on the focal length between the semiconductor laser 101 and the collimator lens 104 (hereinafter, referred to as "focal length position"), the laser light in a parallel state enters into the objective lens 109. As stated above, under the condition that the parallel laser light enters into the objective lens 109, the focal position with minimum spherical aberration will be referred hereinafter to as "designed focal position." In FIG. 3A, the objective lens 109 is configured in such a manner the designed focal position is located at the center of the cover thickness correction range (from the recording layers L0 to Ln).

With the objective lens 109 configured as stated above, when the focal position of the laser light is shifted by the objective lens 109 from the recording layers L0 to Ln, the position of the collimator lens 104 with an optimum reproduction RF signal (hereinafter, referred to as "optimum position") is also changed accordingly. For example, if the focal position is on the recording layer L0, the optimum position of the collimator lens 104 is situated at a distance P0 from the objective lens 109; and if the focal position is on the recording layer Ln, the optimum position of the collimator lens 104 is situated at a distance Pn from the objective lens 109.

In addition, while the collimator lens 104 is driven according to the shift of the focal position of the laser light, the rim intensity becomes maximum when the collimator lens 104 is located at the position of P0 or Pn. In contrast, the rim intensity becomes minimum when the collimator lens 104 is located at the focal length position. Further, a bottom position of the graph of rim intensity almost overlaps an intermediate point in a drive range of the collimator lens 104 (between P0 and Pn).

In this case, a difference between maximum and minimum values of rim intensity within the drive range of the collimator lens 104 (between P0 and Pn) (hereinafter, referred to as "rim intensity change amount") is minimized as shown in FIG. 3B. Accordingly, variations in the rim intensity due to driving of the collimator lens 104 can be reduced to thereby realize stable recording performance for each of the recording layers.

However, the distance L between the collimator lens 104 and the objective lens 109 may need to be altered from that shown in FIG. 3A, depending on the design of the light source system. In such cases, the rim intensity of the laser light changes from the state shown in FIG. 3B.

Figure 4A:
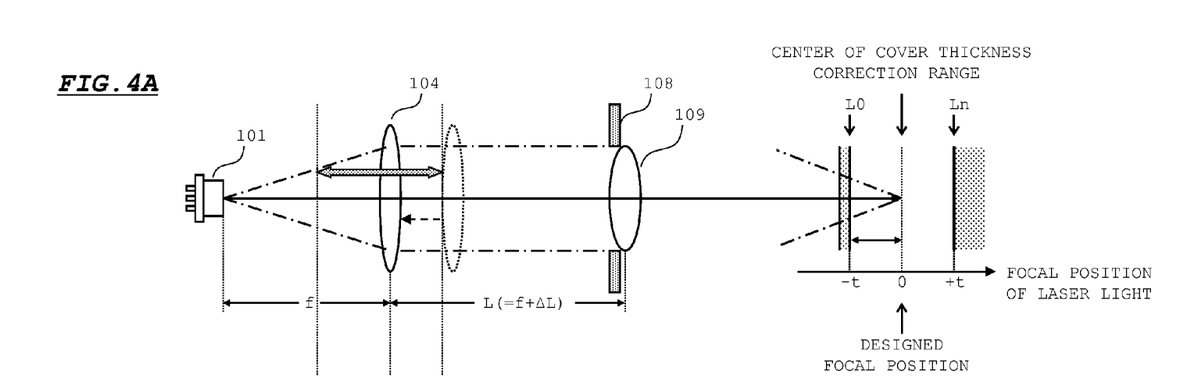
FIGS. 4A and 4B are diagrams for describing the embodiment, and show that a rim intensity varies when a semiconductor laser and the collimator lens are moved to the left from the state shown in FIG. 3A.
Figure 4B:
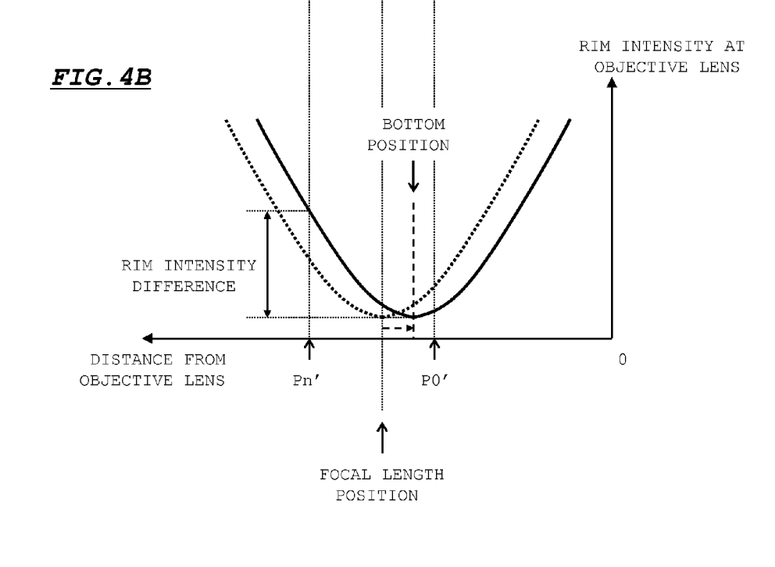

FIG. 4A shows that the semiconductor laser 101 and the collimator lens 104 are moved by ΔL to the left from the state shown in FIG. 3A to lengthen the distance L between the collimator lens 104 and the objective lens 109. FIG. 4B is a graph of rim intensity (made in a solid line) showing that the semiconductor laser 101 and the collimator lens 104 are moved by ΔL to the left in the same manner as shown in FIG. 4A. Further, a graph of a dashed line in FIG. 4B is a graph shown in FIG. 3B shifted by ΔL to the left.

In the arrangement of FIG. 4A, the range of optimum position of the collimator lens 104 (between P0' and Pn') is further slightly shifted to the left from the range shown in FIG. 3B (between P0 and Pn) shifted by ΔL to the left (refer to FIG. 4B). In addition, the bottom position of the graph of rim intensity is largely off an intermediate point between P0' and Pn'.

In this case, the rim intensity change amount in the drive range of the collimator lens 104 (between P0' and Pn') becomes larger than that in FIG. 3B, as shown in FIG. 4B. Thus, the rim intensity varies widely due to driving of the collimator lens 104, which may not attain stable recording performance for each of the recording layers.

Accordingly, in this embodiment, the objective lens 109 is configured as described below to reduce variations in the rim intensity due to driving of the collimator lens 104.

Figure 5A:
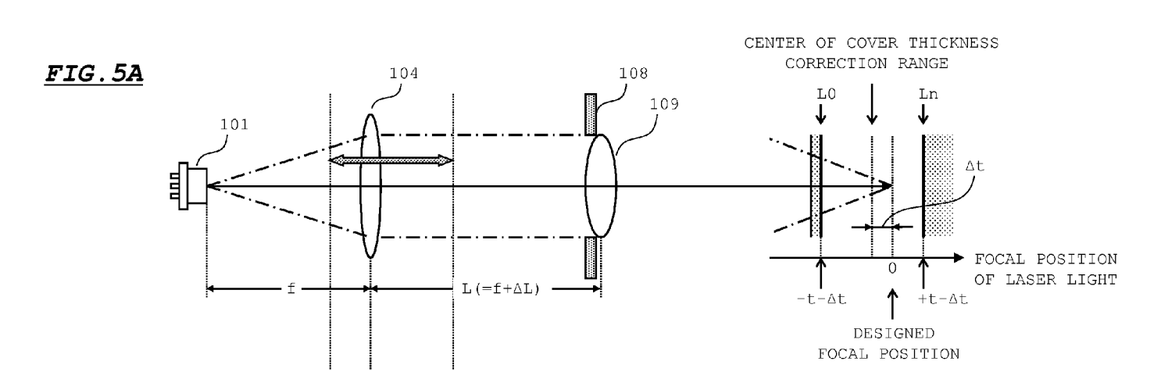
FIGS. 5A and 5B are diagrams for describing the embodiment, and show that a rim intensity varies when a designed focal position of laser light determined by the objective lens is shifted from that shown in FIG. 4A to the right (inner side) along a direction of an optical axis.

FIG. 5A shows that the designed focal position of the laser light is shifted by the objective lens 109 by Δt from the state shown in FIG. 4A to the right (inner side) along the optical axis direction. As illustrated, the collimator lens 104 is located at the same focal length position as that shown in FIG. 4A, and thus the laser light in a parallel state enters into the objective lens 109. In this embodiment, the objective lens 109 is designed to bring the parallel light into focus with minimum spherical aberration at a position where the objective lens 109 is moved by Δt to the right (inner side) from the center of the disc cover thickness correction range.

In the foregoing arrangement, the focal length position of the collimator lens 104 and the bottom position of the graph of rim intensity are not different from those shown in FIG. 4B. The range of optimum position of the collimator lens 104 (between P0" and Pn") is shifted to the right from the range shown in FIG. 4B, according to shift of the designed focal position.

In this case, the bottom position of the graph of rim intensity is located closer to an intermediate point between P0" and Pn" than that shown in FIG. 4. Therefore, the illustrated rim intensity change amount becomes smaller than that in FIG. 4B in the drive range of the collimator lens 104 (between P0" and Pn"). Accordingly, variations in the rim intensity due to driving of the collimator lens 104 are slightly wider than those in FIG. 3B but are prominently reduced as compared with those in FIG. 4B.

When the designed focal position is adjusted as stated above, an optimum position (P0") of a right end of the collimator lens 104 is shifted to the right as compared with that in FIG. 4A, as shown in FIG. 5A. However, if an original purpose of designing this optical system is to lengthen the distance L between the collimator lens 104 and the objective lens 109 as stated above, when the optimum position (P0") of the right end of the collimator lens 104 is shifted to the right, the distance between the objective lens 109 and the collimator lens 104 at the optimum position (P0") becomes shorter than that in FIG. 4A, which does not serve the original purpose in optical system design.

Accordingly, in this embodiment, even when the collimator lens 104 is located at the optimum position (P0"), the designed focal position needs to be shifted from the center of the cover thickness correction range to such an extent of not affecting a clearance between the collimator lens 104 and the objective lens 109. Specifically, the objective lens 109 needs to be designed considering whether a distance of rightward shift of the optimum position (P0") of the collimator lens 104 on the right end would have no adverse effect on the original purpose in optical system design, while providing improvement in the rim intensity change amount.

In addition, the designed focal position needs to be set so as to allow coma aberration caused by the objective lens 109, while providing improvement in the rim intensity. Specifically, if the designed focal position is changed as shown in FIG. 5A, the optimum position (P0") of the right end of the collimator lens 104 becomes largely off the focal length position. Accordingly, if the collimator lens 104 is located near the optimum position (P0") of the right end of the collimator lens 104 to thereby bring the laser light into focus on the foremost recording layer L0, a larger coma aberration is generated by an optical axis displacement of the laser light with respect to the objective lens 109. Therefore, the designed focal position of the laser light determined by the objective lens 109 also needs to be designed so as to allow occurrence of coma aberration.

Next, this embodiment's effect of reducing the rim intensity change amount will be described below using results of a simulation performed by the inventor of the subject application.

Figure 6:
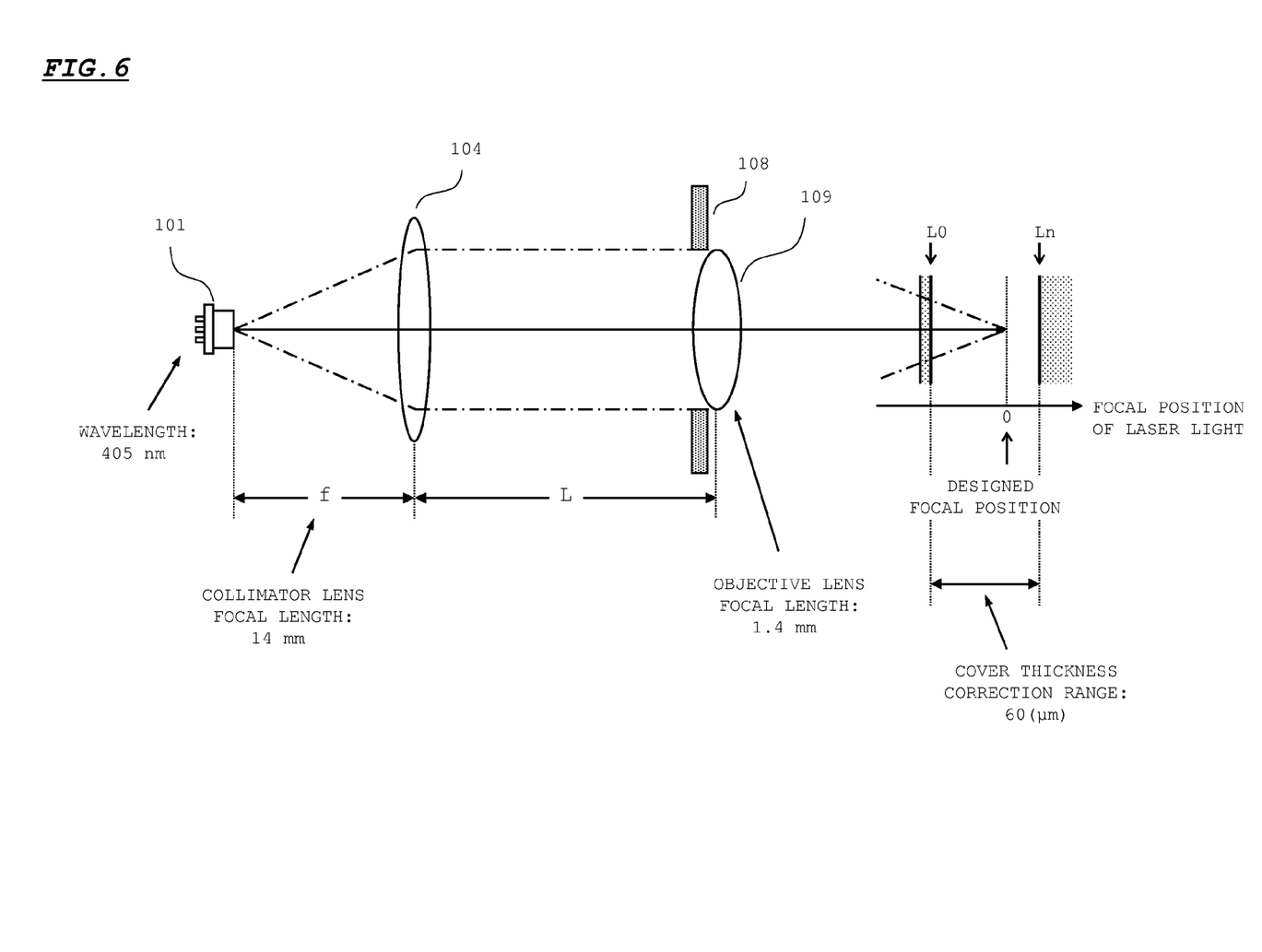
FIG. 6 is a diagram showing an optical system used for a simulation with the embodiment.

FIG. 6 shows an optical system used for the simulation in this embodiment. In the diagram, the optical system components identical to those shown in FIGS. 3A, 4A, and 5A are given the same reference numerals as those in FIGS. 3A, 4A, and 5A.

The followings are conditions for setting of this optical system:
(1) Laser light wavelength: 405 nm
(2) Focal length (f) of the collimator lens 104: 14 mm
(3) Focal length of the objective lens 109: 1.4 mm
(4) Lateral magnification determined by the objective lens 109 and the collimator lens 104: 10
(5) Spread angle of the laser light (horizontal): 9 degrees
(6) Spread angle of the laser light (vertical): 20 degrees (7) Clearance (L) between the focal length position of the collimator lens 104 and the objective lens 109: f (mm), f+6 (mm), and f+11 (mm)

(8) Disc cover thickness correction range: 60 μm (9) Shift range of the focal position with respect to the designed focal position: +30/−30 (μm), +10/−50 (μm), and +0/−60 (μm)

Figure 7:
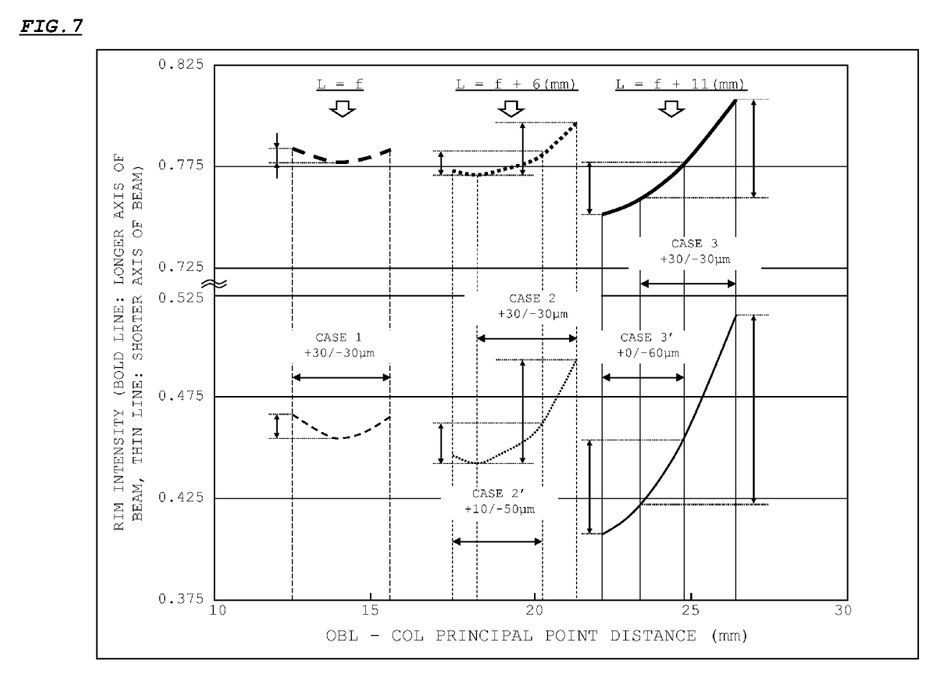
FIG. 7 is a diagram showing results of the simulation with the embodiment.

FIG. 7 shows the rim intensity of the laser light entered into the objective lens 109 in the simulation under the foregoing setting conditions. In the diagram, the axis of abscissas indicates a distance between principal points in the objective lens 109 and the collimator lens 104, and the axis of ordinate indicates the rim intensity. In the graph, a bold line refers to the rim intensity in a horizontal direction (a direction of the longer axis of the beam) with a larger spread angle of the laser light, and a thin line refers to the rim intensity in a vertical direction (a direction of the shorter axis of the beam) with a smaller spread angle of the laser light. Rim intensity measurement was made using a beam profiler or the like at the position of the objective lens 109.

Cases shown in FIG. 7 are set as follows:

Case 1: L=f, and the designed focal position is set at the center of the cover thickness correction range (the shift range of the focal position with respect to the designed focal position: +30/−30 (μm))

Case 2: L=f+6, and the designed focal position is set at the center of the cover thickness correction range (the shift range of the focal position with respect to the designed focal position: +30/−30 (μm))

Case 2': L=f+6, and the designed focal position is set on an inner side of 20 μm from the center of the cover thickness correction range (the shift range of the focal position with respect to the designed focal position: +10/−50 (μm))

Case 3: L=f+11, and the designed focal position is set at the center of the cover thickness correction range (the shift range of the focal position with respect to the designed focal position: +30/−30 (μm))

Case 3': L=f+11, and the designed focal position is set on an inner side of 30 μm from the center of the cover thickness correction range (the shift range of the focal position with respect to the designed focal position: +0/−60 (μm))

Up-down arrows in FIG. 7 indicate rim intensity change amounts in the foregoing cases.

In Case 1, the rim intensity change amount is minimized as shown in FIG. 3B. In each of Cases 2 and 3, the rim intensity change amount becomes larger with the increasing distance L. Conversely, in Cases 2' and 3', the rim intensity change amounts are decreased as compared with Cases 2 and 3, respectively.

Consequently, this simulation has revealed that, with the distance L larger than the focal length f, the rim intensity change amount can be reduced by shifting the designed focal position to the right (inner side) from the center of the cover thickness correction range.

According to this embodiment as stated above, if the semiconductor laser 101 and the collimator lens 104 are shifted to the left, the rim intensity change amount of the laser light entered into the objective lens 109 can be decreased by shifting the designed focal length of the laser light by the objective lens 109 to the right (inner side) from the center of the cover thickness correction range. This suppresses changes in recording characteristics for each of the recording layers, thereby offering stable recording performance.

Modified Embodiment

In the foregoing embodiment, the designed focal position of the laser light is shifted by the objective lens 109 with change in the design of the objective lens itself. Alternatively, in this modified embodiment, a correction plate is provided on the aperture 108 side of the objective lens 109 so that the correction plate is driven together with the objective lens 109 to shift the designed focal position.

Figure 8:
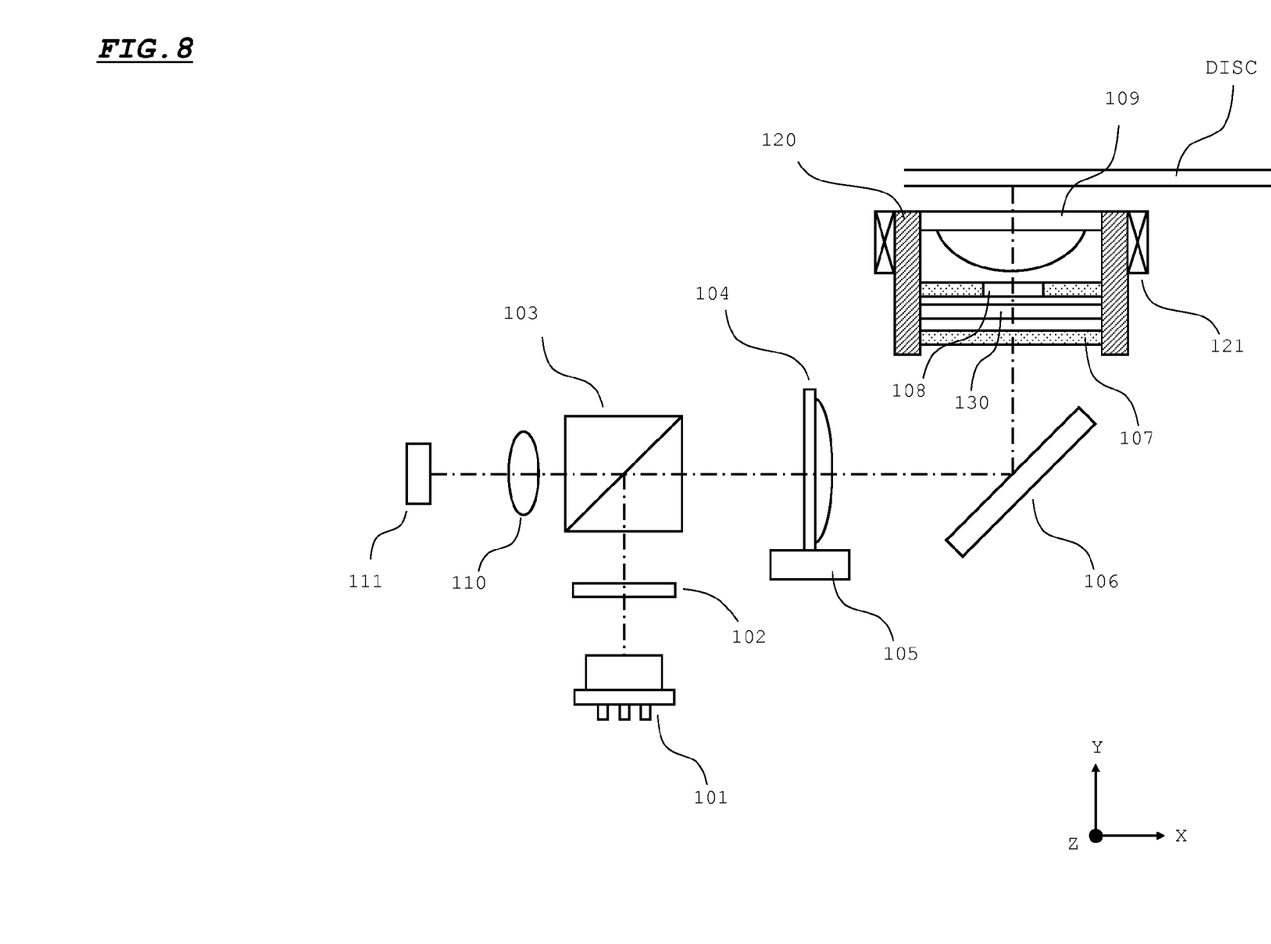
FIG. 8 is a diagram showing an arrangement of an optical pickup device in a modification of the present invention.

FIG. 8 shows an optical system in this modified embodiment. In this modified embodiment shown in FIG. 8, a correction plate 130 is interposed between the aperture 108 and the quarter wavelength plate 107 in the optical system of FIG. 1. The holder 120 holds the correction plate 130 together with the objective lens 109.

Figure 9A:
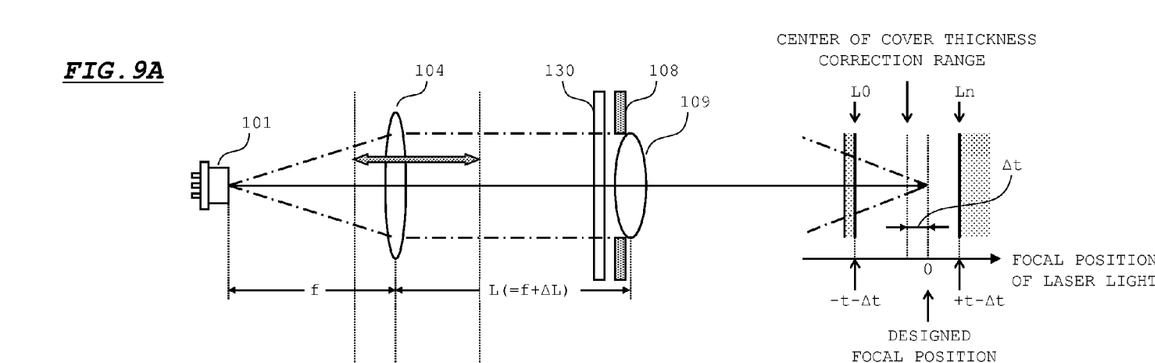
FIGS. 9A and 9B are diagrams for describing improvements in a change amount of rim intensity in the modification of the present invention.

Unlike in the foregoing embodiment, the objective lens 109 is configured to set the designed focal position at the center of the cover thickness correction range. The correction plate 130 performs a lens function of shifting the designed focal position to the right (inner side) from the center of the cover thickness correction range in cooperation with the objective lens 109, as in the foregoing embodiment. The correction plate 130 may be formed by a diffraction lens, for example. In the state of FIG. 9A, the correction plate 130 performs both a lens function of shifting the focal position by Δt to the right (inner side) from the center of the cover thickness correction range and a lens function of reducing spherical aberration to zero at the shifted focal position. Such functions can be realized by adjusting a diffraction pattern of the diffraction lens.

In FIG. 8, the correction plate 130 is located at a position in front of the aperture 108. Alternatively, the correction plate 130 may be interposed between the aperture 108 and the objective lens 109. Preferably, the aperture 108, the objective lens 109, and the correction plate 130 are arranged closer to each other as much as possible in the optical axis direction. The aperture 108 may be omitted such that the correction plate 130 also serves as an aperture.

Figure 9B:
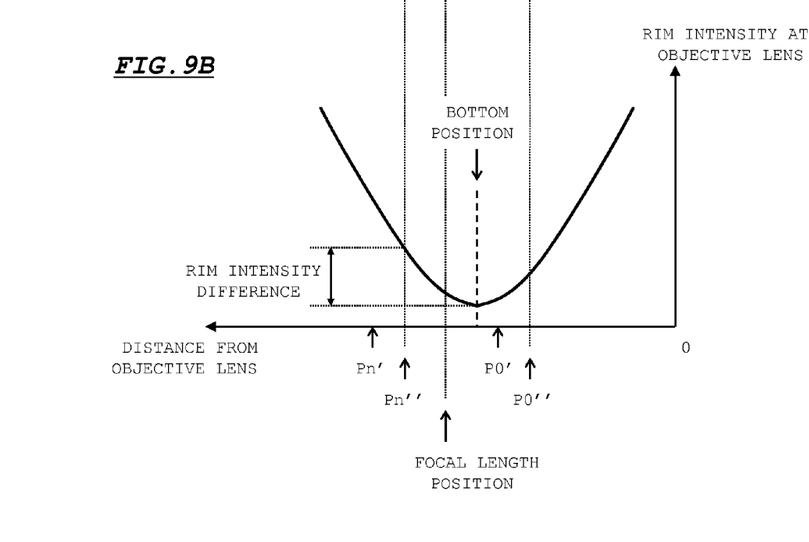

FIG. 9B shows that the correction plate 130 shifts the range of the optimum position of the collimator lens 104. The range of the optimum position of the collimator lens 104 is set in the same manner as in the foregoing embodiment. In addition, the graph of rim intensity shown in FIG. 9B is the same as that in the foregoing embodiment shown in FIG. 5B.

Referring to FIG. 9A, the correction plate 130 is configured in such a manner that, if the collimator lens 104 is located at the same focal length position as that shown in FIG. 4A, the laser light is focused with minimum spherical aberration at a position shifted by Δt to the right (inner side) from the center of the disc cover thickness correction range.

Figure 5B:
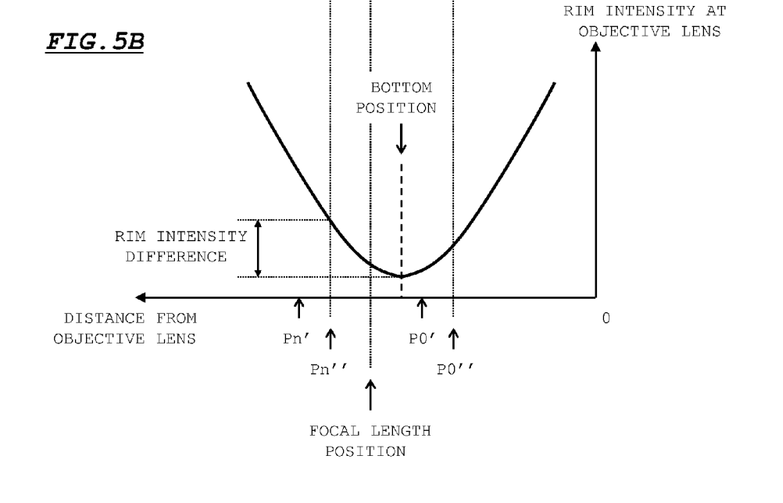

Accordingly, as in the case shown in FIG. 5B, the range of optimum position of the collimator lens 104 is shifted to the right from the range shown in FIG. 4B. This reduces rim intensity variations due to driving of the collimator lens 104, as compared with those in FIG. 4B. Consequently, the rim intensity change amount of the laser light entered into the objective lens 109 can be decreased as in the foregoing embodiment.

In this modified embodiment, the correction plate 130 in the state of FIG. 9A performs both a lens function of shifting the focal position by Δt to the right (inner side) from the center of the cover thickness correction range and a lens function of reducing spherical aberration to zero at the shifted focal position. Alternatively, the correction plate 130 may perform only a lens function of eliminating spherical aberration. In this case, the correction plate 130 is provided with a diffraction pattern or a phase-difference structure so as to eliminate spherical aberration due to movement of the objective lens 109 for obtaining focus on the right side (inner side) of the center of the cover thickness correction range by Δt.

Further, in this modified embodiment, the objective lens 109 is configured to bring incident laser light in a parallel state into focus with minimum spherical aberration at the center of the cover thickness correction range. Alternatively, the objective lens 109 may be configured to bring the laser light into focus with minimum spherical aberration at any position other than the foregoing one, or may be configured to bring incident laser light in a non-parallel state into focus with minimum spherical aberration at the center or any other position of the cover thickness correction range. That is, all required for the objective lens 109 and the correction plate 130 is to bring incident laser light in a parallel state into focus with minimum spherical aberration at the designed focal position on the converging lens part formed by the objective lens 109 and the correction plate 130.

The foregoing descriptions are provided as to the embodiment and modified embodiment of the present invention. However, the present invention is not limited by the foregoing embodiment or the modified embodiment. In addition, the present invention can be embodied in various modes other than that described above.

For example, in the foregoing embodiment, the semiconductor laser 101 and the collimator lens 104 are moved to the left. However, the present invention can also be applied to an arrangement in which the semiconductor laser 101 and the collimator lens 104 are moved to the right to shorten the distance between the collimator lens 104 and the objective lens 109.

Figures 10A, 10B:
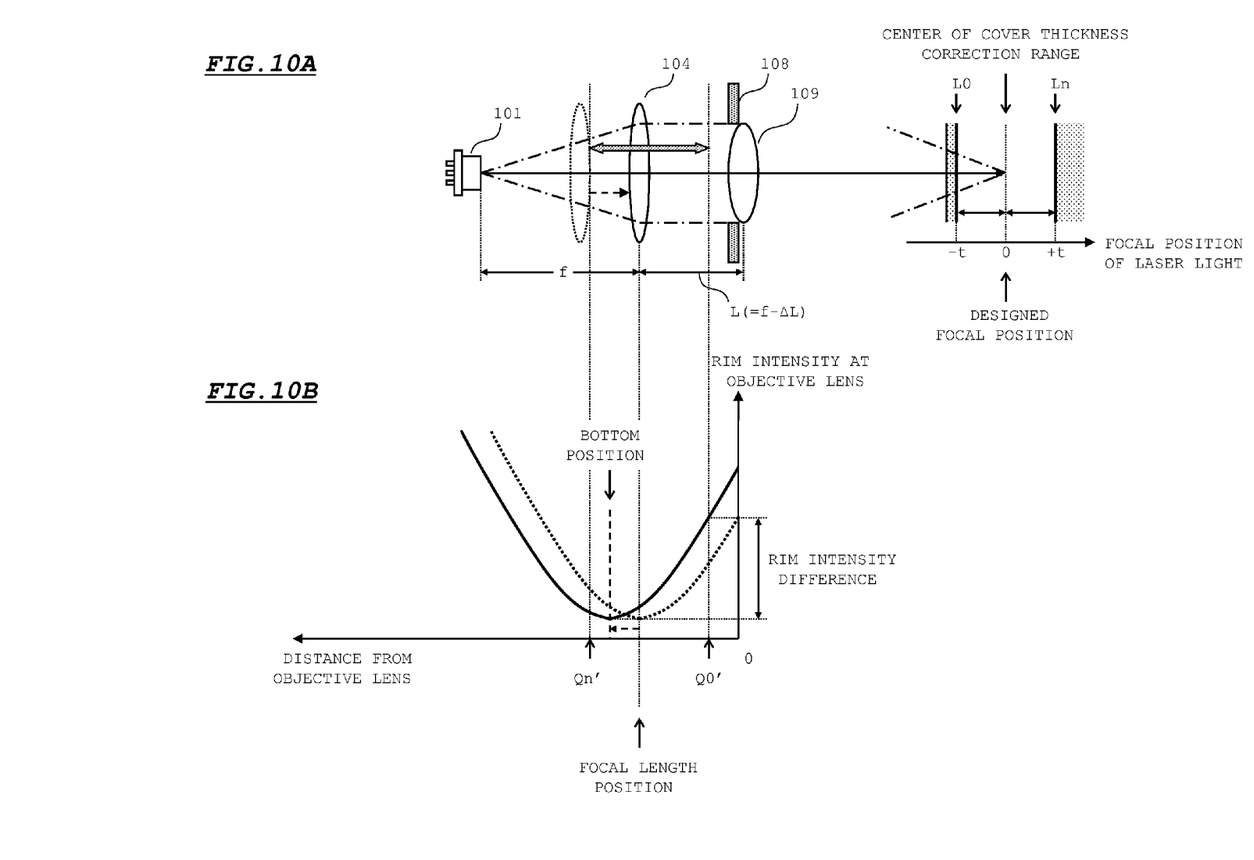
FIGS. 10A and 10B are diagrams for describing another modification, and show a change amount of rim intensity that is measured when the semiconductor laser and the collimator lens are shifted to the right from the state shown in FIG. 3.

FIG. 10A shows that the semiconductor laser 101 and the collimator lens 104 are moved by $\Delta L$ to the right from the state of FIG. 3A. FIG. 10B shows rim intensity change amounts (a graph made in a solid line) in which the semiconductor laser 101 and the collimator lens 104 are moved by $\Delta L$ to the right as in the case of FIG. 10A. In a graph of a dashed line of FIG. 10B, the graph of FIG. 3B is shifted by $\Delta L$ to the right.

In the arrangement of FIG. 10A, the range of optimum position of the collimator lens 104 (between Q0' and Qn') is further shifted to the right from the range shifted by $\Delta L$ to the right from the state in FIG. 3B (refer to FIG. 10B). In addition, a bottom position of the graph of rim intensity is largely off an intermediate point between Q0' and Qn' as compared with that in FIG. 3B. In this case, the rim intensity change amount becomes larger than that in FIG. 3B, as shown in FIG. 3B.

Figure 11A:
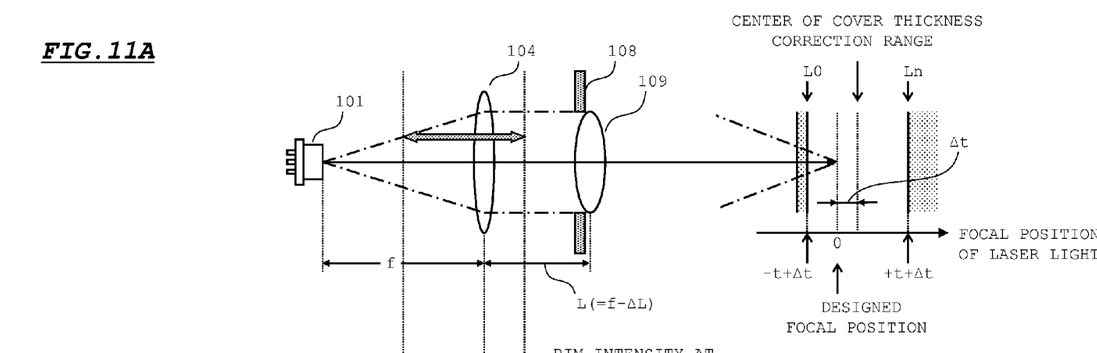
FIGS. 11A and 11B are diagrams for describing the another modification, and show a change amount of rim intensity that is measured when a designed focal position of laser light determined by the objective lens is shifted from that shown in FIG. 10 to the left (front side).

FIG. 11 shows that the designed focal position of the laser light is shifted by the objective lens 109 by $\Delta t$ to the left (front side) along the optical axis direction. As shown in FIG. 11A, the collimator lens 104 is located at the same focal length position as that in FIG. 10A, and thus the laser light in a parallel state enters the objective lens 109. In this state, the objective lens 109 is configured to bring the laser light into focus with minimum spherical aberration at a position shifted by $\Delta t$ to the left (front side) from the center of the cover thickness correction range.

In this arrangement, the focal length position of the collimator lens 104 and the bottom position of the graph of rim intensity are not different from those in FIG. 10B. The range of optimum position of the collimator lens 104 (between Q0" and Qn") is shifted to the left from the range in FIG. 10B, according to shift of the designed focal position.

Figure 11B:
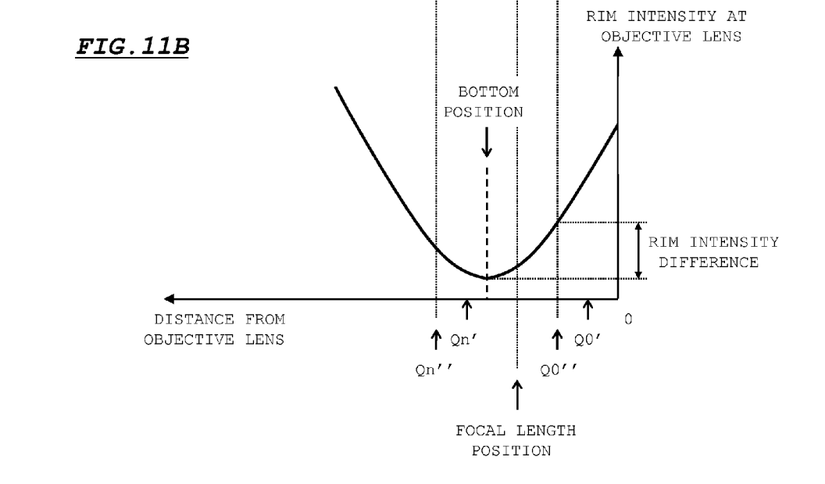

In this case, the rim intensity change amount also becomes smaller than that in FIG. 10B, as shown in FIG. 11B. Accordingly, rim intensity variations due to driving of the collimator lens 104 are slightly wider than those in FIG. 3B, but are reduced as compared with those in FIG. 10B.

Further, in the foregoing embodiment, a spread angle of the laser light is changed by moving the collimator lens 104 in the optical axis direction. Alternatively, a beam expander with a combination of a concave lens and a convex lens may be used for that purpose in place of the collimator lens 104.

Besides, embodiments of the present invention can be appropriately modified in various manners within the scope of a technical idea disclosed in the claims.

What is claimed is:

1. An optical pickup device for recording and/or reproducing information onto and/or from a disc having a plurality of recording layers in a direction of lamination, comprising:
   a laser light source;
   an angle adjustment element moving in a direction of an optical axis to change a spread angle of laser light emitted from the laser light source; and
   a converging lens part for converging the laser light having passed through the angle adjustment element onto the disc, wherein
      with the laser light in a parallel state having passed through the angle adjustment element, if a distance L1 between the laser light source and the angle adjustment element and a distance L2 between the angle adjustment element and the converging lens are in a relation of L1<L2, the converging lens part is configured to bring the incident parallel laser light into focus with minimum spherical aberration at a designed focal position on the inner side of an intermediate position between the foremost and innermost recording layers; and if the distances L1 and L2 are in a relation of L1>L2, the converging lens is configured to bring the incident parallel laser light into focus with minimum spherical aberration at a designed focal position on the front side of the intermediate position.

2. The optical pickup device according to claim 1, wherein the converging lens part is formed by an objective lens.

3. The optical pickup device according to claim 1, wherein the converging lens part has an objective lens configured to bring the laser light into focus with minimum spherical aberration at a position other than the designed focal position; and a correction plate for bringing the laser light into focus with minimum spherical aberration at the designed focal position.

* * * * *